US012526142B2

(12) United States Patent
Macchetti et al.

(10) Patent No.: US 12,526,142 B2
(45) Date of Patent: Jan. 13, 2026

(54) CRYPTOGRAPHY

(71) Applicant: NAGRAVISION SARL, Cheseaux-sur-Lausanne (CH)

(72) Inventors: Marco Macchetti, Cheseaux-sur-Lausanne (CH); Jerome Perrine, Cheseaux-sur-Lausanne (CH); Nicolas Fischer, Cheseaux-sur-Lausanne (CH)

(73) Assignee: NAGRAVISION SARL, Cheseaux-sur-Lausanne (CH)

( * ) Notice: Subject to any disclaimer, the term of this patent is extended or adjusted under 35 U.S.C. 154(b) by 44 days.

(21) Appl. No.: 18/713,457

(22) PCT Filed: Dec. 8, 2022

(86) PCT No.: PCT/EP2022/084938
§ 371 (c)(1),
(2) Date: May 24, 2024

(87) PCT Pub. No.: WO2023/104951
PCT Pub. Date: Jun. 15, 2023

(65) Prior Publication Data
US 2025/0023729 A1     Jan. 16, 2025

(30) Foreign Application Priority Data
Dec. 8, 2021 (EP) ..................... 21213270

(51) Int. Cl.
*H04L 9/30* (2006.01)
*H04L 9/08* (2006.01)

(52) U.S. Cl.
CPC .......... *H04L 9/3073* (2013.01); *H04L 9/0866* (2013.01)

(58) Field of Classification Search
CPC .... H04L 9/3073; H04L 9/0866; H04L 9/0838
See application file for complete search history.

(56) References Cited

U.S. PATENT DOCUMENTS 7,113,594 B2   9/2006  Boneh et al.
12,278,817 B1 * 4/2025  Raj ..................... H04L 63/101
(Continued)

OTHER PUBLICATIONS

Y. Chen, J.-F. Martínez, P. Castillejo and L. López, "A Bilinear Map Pairing Based Authentication Scheme for Smart Grid Communications: PAuth," in IEEE Access, vol. 7, pp. 22633-22643, 2019. (Year: 2019).*

(Continued)

*Primary Examiner* — Kari L Schmidt
(74) *Attorney, Agent, or Firm* — POLSINELLI LLP

(57) ABSTRACT

A pairing method between a user device (1) and an operator device (2), the user device (1) being intended to receive conditional access data from the operator device (2), the user device having a user device identifier ($U_{ID}$), the operator having an operator device identifier ($O_{ID}$). The method comprises receiving, by the user device, a user device key ($KU_{ID}$) derived from a first cryptographically secure function and receiving, by the operator device, an operator key ($KO_{ID}$) derived from a second cryptographically secure function. The user device comprises a user device bilinear mathematical function ($e(KU_{ID}, O_{ID})$) and the operator device comprises an operator bilinear mathematical function ($e(U_{ID}, KO_{ID})$) which each define a pairing over an elliptic curve. The method includes generating, by the operator device (2), a pairing key ($KD=e(U_{ID}, KO_{ID})$) between the user device (1) and the operator device (2), using the operator key ($KO_{ID}$) and the device identifier ($U_{ID}$) as variables of the operator mathematical function ($e(U_{ID}, KO_{ID})$). The user device (1) generates the same pairing key ($KD=e(KU_{ID}, O_{ID})$) using the user device key ($KU_{ID}$) and the operator device identifier ($U_{ID}$) as variables of the user device mathematical function $e(KU_{ID}, O_{ID})$.

20 Claims, 4 Drawing Sheets

(56) References Cited

U.S. PATENT DOCUMENTS

| | | | |
|---|---|---|---|
| 2012/0045051 A1* | 2/2012 | Nogami | G06F 7/725 380/28 |
| 2016/0142206 A1* | 5/2016 | Canard | G06F 7/588 380/46 |
| 2016/0241527 A1 | 8/2016 | Fischer et al. | |
| 2017/0053566 A1* | 2/2017 | Takashima | G09C 1/00 |
| 2019/0281453 A1* | 9/2019 | Shi | H04L 63/0823 |
| 2020/0014534 A1 | 1/2020 | Garcia Morchon | |
| 2020/0052905 A1* | 2/2020 | Mathias | H04L 9/3265 |
| 2022/0021529 A1* | 1/2022 | Chen | H04L 9/3247 |
| 2024/0413984 A1* | 12/2024 | Rindal | H04L 9/3218 |

OTHER PUBLICATIONS

F. Guo, Y. Mu, W. Susilo, H. Hsing, D. S. Wong and V. Varadharajan, "Optimized Identity-Based Encryption from Bilinear Pairing for Lightweight Devices," in IEEE Transactions on Dependable and Secure Computing, vol. 14, No. 2, pp. 211-220, Mar. 1-Apr. 2017. (Year: 2017).*

Yu et al., "Hierarchical-CPK-Based Trusted Computing Cryptography Scheme" Sep. 2, 2011, Advances in Biometrics: International Conference ICB 2007; Proceedings (Lecture Notes in Computer Science, pp. 149-163 XP019162406, ISBN: 978-3-540-74549-5.

European Extended Search Report, EP Application No. 21213270.8 dated Jun. 1, 2022; 10 pages.

"Identity-Based Encryption from the Weil Pairing" SIAM J. of Computing, vol. 32, No. 3, 2003.

A. Faz-Hernandez et al. "Hashing to Elliptic Curves" Internet Draft, Mar. 9, 2020, 148 pages.

Y. Sakemi et al., "Pairing-Friendly Curves" Internet Draft, Mar. 19, 2020, 423 pages.

D. Boneh et al., "BLS Signatures" Internet Draft, Sep. 10, 2020, 30 pages.

* cited by examiner

CRYPTOGRAPHY

CROSS-REFERENCES TO RELATED APPLICATIONS

This application is a U.S. National Stage of PCT Application No. PCT/EP2022/084938, filed Dec. 8, 2022, which claims the priority benefit of European Patent Application No. 21213270.8 filed on Dec. 8, 2021, both of which are incorporated herein by reference in their entirety for all purposes.

FIELD OF THE INVENTION

The present invention relates to a method, system and apparatus for pairing between an operator and a multimedia unit.

BACKGROUND

Operators of systems providing TV broadcast content, digital content or multi-media content to end users (e.g., 'pay-TV' subscribers etc.) must provide a means of enforcing some form of protected access or conditional access to end users via one or more devices of the end user (e.g., a TV, laptop, smartphone etc.). This may be implemented by means of cryptographic algorithms implemented by both the operator's system and the end-user device.

In the field of providing conditional access content, such as TV programs, films, online access to multi-media content and other data, a user wishing to consume conditional access content typically buys a user device (e.g., a multimedia unit), such as a set-top-box, and contacts an operator who provides the conditional access content in question, in order to perform the steps necessary to activate this user device to enable it to access the operator's conditional access content.

The multimedia unit owned or used by a particular user (i.e., a user device) is typically initially manufactured for, and delivered to, a particular operator who then offers the multimedia unit for purchase by end users. The operator typically orders conditional access keys from a conditional access system supplier who delivers them to the operator for use with the operator's multimedia units. This process can involve a waiting time of several days between the moment when the user devices are delivered to the operator and the moment when the related keys are received by the operator and are operational in order to allow the use of the user devices.

In many existing systems, the user may have to wait several days for the delivery of the necessary cryptographic key(s) relating to the operator and the particular user device in question, before that user device can be activated. Furthermore, to allow an operator to be able to supply cryptographic keys to many user devices as and when requested by users in possession of those user devices, it is typically necessary to pre-deliver to the operator all of the necessary cryptographic keys relating to the user devices in question. This represents a very large quantity of key because all of the keys relating respectively to all of the user devices in question are needed.

If the user device is paired with the operator during initialisation of the user device at the final user premises, the operator is the one carrying out the personalization of the user devices through its transmission system. In order to do this, the operator has to know the secret data which allows the personalization of the user devices. If a user device is not paired with a given operator before being placed on the market, any operator can then personalize the user device in question. This makes the user device more vulnerable to theft because a stolen user device can then be used by any other operator.

In order to reduce this vulnerability, a conditional access system supplier must transmit the personalization secret data to a given operator only for the units that this operator has purchased from the user device manufacturer. This requires one to list each user device produced for a given operator and requires one to trace the delivery of user devices to operators, which causes more effort and delay. US patent application documents US2016/241527 A1 (Nagravision) and US2020/014534 A1 (Philips) disclose systems for forming cryptographic pairings.

The present invention has been devised in light of the above considerations.

SUMMARY OF THE INVENTION

The invention relates to, for example but not exclusively, a pairing method between an operator, or a plurality of operators, and a multimedia unit. The invention also relates to, for example, a system comprising an operator unit or system, or a plurality of operator units/systems, and a multi-media unit or a plurality of multi-media units.

The invention relates to, for example but not exclusively, operator units or systems configured to transmit information to a multi-media unit or a plurality of multi-media units as a one-way 'broadcast' communication, or 'multi-cast' communication or 'point-to-point' communications. This includes the use of one-way communications channels for this purpose. Examples of this include television (TV) systems, such as 'pay-TV', in which one-way communications are transmitted by terrestrial or satellite radio channels, or by cable channels. The receiving multi-media unit(s) receive information via these one-way channels without the facility to issue communications back to the transmitter of the information (e.g., the operator). The invention relates to, for example but not exclusively, digital rights management (DRM) systems.

The inventors have realised that cryptographic pairings can be used to provide a pairing method between an operator, or a plurality of operators, and a multimedia unit, by exploiting the bilinearity property of cryptographic pairings on elliptic curves.

Elliptic Curve Pairings

An elliptic curve pairing is a function "e" that takes a pair of points on an elliptic curve and returns an element of another group, called the target group:

$$e: G_1 \times G_2 \to G_T$$

In particular, a pairing is a bilinear map that takes as its input two points from a respective one of two distinct sub-groups (i.e., the sub-groups $G_1$ and $G_2$) of points. These distinct sub-groups are of the same order. Each of these two sub-groups contains respective points. The elliptic curve E is defined over a "field" of points ($F_p$) from within the first one of these two sub-groups $G_1$ only where the equation defining the curve has solutions where the coordinates of the curve are both integers less than a defined number, p, known as the field modulus. The points on the elliptic curve E satisfy an equation of the form, for example:

$$E: y^2 = x^3 + Ax + B$$

Here A and B are constants. The coordinates (x, y) on the elliptic curve are both elements of the finite field $F_p$ (i.e., they are simple numbers, with the exception that arithmetic is done modulo a prime number, p). The elliptic curve E is also defined over a "field extension" of points ($F_{p^k}$). It has points from within the second one of these two sub-groups $G_2$ only where the equation defining the curve E has solutions where the coordinates (x, y) of the curve are both integers less than a defined number, $p^k$, in which k is an integer known as the embedding degree of the curve. As an illustrative example, in which A=0 and B=4 (or B=4(1+i) in the extension field):

$$G_1 \subset E(F_p) \text{ where } E: y^2 = x^3 + 4$$
$$G_2 \subset E(F_{p^2}) \text{ where } E: y^2 = x^3 + 4(1+i)$$

Here, k=2; i=$\sqrt{-1}$. The item $G_T$ is the type of object that the result of the function $e(g_1, g_2)$ goes into. It is possible to make a bilinear map over elliptic curve points. That is to say, it is possible to define a function $e(g_1, g_2)$ where the inputs $g_1$, $g_2$ are elliptic curve points, and where the output is an element of a finite field (e.g., an element of $F_{p^k}$, such as is well-known in the art). A pairing $e(g_1, g_2)$ takes a point $g_1 \in G_1 \subset E(F_{p^k})$, and a point $g_2 \in G_2 \subset E(F_{p^k})$, and outputs a point from a group $G_T \subset F_{p^k}$. That is, for a pairing e: $G_1 \times G_2 \rightarrow G_T$. The elliptic curve may be, for example, BLS12-381 which the embedding degree k=12 and the field modulus p=381.

For given points $g_1$, $g_2$ and $g_3$ on an elliptic curve, and for given integers a and b, the elliptic curve pairing function has the following bilinear properties:

$$e(a*g_1, g_2) = e(g_1, g_2)^a$$
$$e(g_1, b*g_2) = e(g_1, g_2)^b$$
$$e(g_1 + g_2, g_3) = e(g_1, g_3)e(g_2, g_3)$$
$$e(g_1, g_2 + g_3) = e(g_1, g_2)e(g_1, g_3)$$

These properties are called bilinear because the pairing is linear in both coordinates.

That is to say, for a cryptographic pairing e: $G_1 \times G_2 \rightarrow G_T$ it is true that:

$$e(g_1, g_2 + g_3) = e(g_1, g_2) \cdot e(g_1, g_3)$$
$$e(g_1 + g_2, g_3) = e(g_1, g_3) \cdot e(g_2, g_3)$$

And this implies that:

$$e(a \cdot g_1, b \cdot g_2) = e(g_1, b \cdot g_2)^a = e(g_1, g_2)^{ab} = e(b \cdot g_1, g_2)^a = e(b \cdot g_1, a \cdot g_2)$$

Thus, $$e(a \cdot g_1, b \cdot g_2) = e(b \cdot g_1, a \cdot g_2)$$

The inventors have realised that if the operation denoted above by "." in the above equations is a cryptographically secure operation (e.g., Discrete-Logarithm-Problem resistant) that mixes a public information "$g_1$" with a secret "a" to give a new secret, then the scheme can be used to provide a pairing method between an operator, or a plurality of operators, and a multimedia unit. As an example, a "Tate pairing" may be implemented. Other pairings readily available to the skilled person, may be used (e.g., a "Weil pairing", as appropriate).

In a first aspect, the invention may provide a pairing method between a user device and an operator device, the user device being intended to receive conditional access data from the operator device, the user device having a user device identifier ($U_{ID}$), the operator having an operator device identifier ($O_{ID}$), the method comprising the steps of:

receiving, by the user device, a user device key ($KU_{ID}$) derived from a first cryptographically secure function;

receiving, by the operator device, an operator key ($KO_{ID}$) derived from a second cryptographically secure function;

wherein the user device comprises a user device bilinear mathematical function (e.g., $e(KU_{ID}, O_{ID})$) and the operator device comprises an operator bilinear mathematical function (e.g., $e(U_{ID}, KO_{ID})$) which each define a pairing over an elliptic curve. The method comprises the steps of:

generating, by the operator device, a pairing key (e.g., $KD=e(U_{ID}, KO_{ID})$) between the user device and the operator device, using the operator key ($KO_{ID}$) and the device identifier ($U_{ID}$) as variables of the operator mathematical function (e.g., $e(U_{ID}, KO_{ID})$); and, generating, by the user device, the same said pairing key (e.g., $KD=e(KU_{ID}, O_{ID})$) between the user device and the operator device, using the user device key ($KU_{ID}$) and the operator device identifier ($O_{ID}$) as variables of the user device mathematical function (e.g., $e(KU_{ID}, O_{ID})$).

Preferably, the first cryptographically secure function and the second cryptographically secure function each comprise a scalar point multiplication operation over a respective group of points of the elliptic curve.

Desirably, the user device identifier ($U_{ID}$) comprises an element of a first group of points on the elliptic curve, and the operator identifier ($O_{ID}$) comprises an element of a second group of points on the elliptic curve.

The user device key ($KU_{ID}$) may be derived from a first cryptographically secure function comprising the scalar point multiplication operation ($KU_{ID}=N \cdot U_{ID}$) of a personalisation key (N) which defines a point on the elliptic curve and the user device identifier ($U_{ID}$) which defines a point on the elliptic curve.

The operator device key ($KO_{ID}$) may be derived from a second cryptographically secure function comprising the scalar point multiplication operation ($KO_{ID}=N \cdot O_{ID}$) of a personalisation key (N) which defines a point on the elliptic curve and the operator device identifier ($O_{ID}$) which defines a point on the elliptic curve.

The personalisation key (N) preferably comprises an integer number, such as a positive integer or a negative integer.

For example, by generating, by the operator device, a pairing key: $KD=e(U_{ID}, KO_{ID})=e(U_{ID}, N \cdot O_{ID})$ between the user device and the operator device, and generating, by the user device, the same pairing key: $KD=e(KU_{ID}, O_{ID})=e(N \cdot U_{ID}, O_{ID})=e(U_{ID}, N \cdot O_{ID})$ between the user device and the operator device the user device and the operator device are able to obtain the same key for their mutual pairing. For example, as a result of the pairing, the user device and the operator device may obtain a common secret which is a point in the target group, $G_T$, from which the pairing key can then be derived with a key derivation function (KDF). In cryptography, as is well known in the art, a key derivation function is a cryptographic algorithm that derives one or more secret keys from a "secret value" such as a main key, a password, or a passphrase using a pseudorandom number or function. For example, as a result of the pairing, the user device and the operator device may obtain a "secret value" in the form of the common secret which is a point in the target group, $G_T$.

Preferably, the device bilinear mathematical function and the operator bilinear mathematical function each define a bilinear mathematical function corresponding to the same cryptographic pairing (e.g., the pairing e: $G_1 \times G_2 \rightarrow Gr$) over the same elliptic curve.

Preferably, the first cryptographically secure function and the second cryptographically secure function each comprise a scalar point multiplication operation over a respective group of points of the elliptic curve. The inventors have found that this the operation denoted above by "·" in the above equations may be the scalar-point multiplication over a group of a suitable elliptic curve (e.g., BLS12-381) which can provide efficiency and an adequate level of security (e.g., 128 bits).

The user device identifier ($U_{ID}$) preferably comprises an element of a first group of points on the elliptic curve. The operator identifier ($O_{ID}$) preferably comprises an element of a second group of points on the elliptic curve.

Desirably, the user device identifier ($U_{ID}$) is generated by applying hash-to-curve algorithm (e.g., $U_{ID}$=H(device ID)) to a device ID of the user device. A hash function H is a function that maps bit strings to points on an elliptic curve, a process commonly known as "hashing to curves" and readily available to the skilled person. A mapping is a deterministic function from an element of a field F to a point on an elliptic curve E defined over F. For example, one may employ a hash-to-curve function H:{0, 1}→E(F) which is a function that maps bit strings {0, 1} to points on an elliptic curve E(F). Desirably, the operator identifier ($O_{ID}$) is generated by applying hash-to-curve algorithm (e.g., $O_{ID}$=H (operator ID)) to an operator ID of the operator.

For example, consider $O_{ID}$ and $U_{ID}$ that are each collections of points on the BLS12-381 curve ($O_{ID} \in G_1$, $U_{ID} \in G_2$ or vice-versa). These may both be public information linked to an operator device and to a user device, respectively. They may be obtained from public IDs by applying a "hash-to-curve" algorithm (H) to the public ID, e.g. $U_{ID}$=H(device ID) and $O_{ID}$=H(operator ID). The hash function used by the "hash-to-curve" algorithm (H) may be secret if desired. It may be used to avoid easy clonability.

A personalisation key (N), this being a secret value N, may be used as a master secret. It may be a secret scalar value never exposed outside of the personalisation entity that uses it to generate keys. The generation of a key may be performed as follows:

N is multiplied with $O_{ID}$ in order to obtain the operator key: $KO_{ID}$=N·$O_{ID}$
N is multiplied with $U_{ID}$ in order to obtain the user device key: $KU_{ID}$=N·$U_{ID}$ The operator key may be stored in a secure manner by the operator entity, while user device key may be stored in an OTP (One-Time-Programmable chip) when the user device is fabricated.

An operator, or each operator, may possess one operator key $KO_{ID}$ (i.e., its own) and may possess, or have access to, the public device ID of one or more user devices. For example, a $U_{ID}$ may be derived easily from public identifiers such as unique identifiers ($U_{ID}$s) (i.e., a trustless authentication API and decentralized identity, readily available to the skilled person). Each device may possess one $KU_{ID}$ (i.e., its own) and the operator ID. For example, an $O_{ID}$ may be derived easily from public identifiers of the operator.

The final device keys KD may be obtained with one pairing in the operator device at the operator premises, and with another pairing in the user device, both giving the same value, KD. This resulting value, KD, is a common secret and is, or can be, used to derive the final user device key to be used in symmetric key algorithms (typically 128 bits). For example, as a result of the pairing, the user device and the operator device may obtain a common secret which is a point in the target group, Gr, from which the pairing key can then be derived with a key derivation function (KDF).

The key KD for the operator device may be computed by the operator device as:

$$KD = e(U_{ID}, KO_{ID}) = e(U_{ID}, N \cdot O_{ID})$$

The key KD for the user device is computed by the user device as:

$$KD = e(KU_{ID}, O_{ID}) = e(N \cdot U_{ID}, O_{ID}) = e(U_{ID}, N \cdot O_{ID})$$

giving the same final value due to the bilinearity property.

The following benefits flow from this pairing technique:

Keys are easily and natively segmented (they are each derived from separate chip information $U_{ID}$, and operator information $O_{ID}$);

Key packages are not required for the operator to service multiple user devices;

Each operator may employ only has its own key and the user device IDs (which can be sent live by the user device);

May avoid the use of a dedicated OTP chip to store operator secrets within the user device;

Each chip may more easily segment its own OTP chip with key information derived from operator information available publicly;

The invention may provide a method for generating a new operator key by merging operator keys used in the pairing method described above, wherein a merged operator key, $KO_{new}$, comprises the sum of respective operator keys $KO_i$ for a plurality of operators:

$$KO_{new} = \sum_{i=1}^{n} KO_{ID}^{(i)}$$

Here $KO_{ID}^{(i)}$=N·$O_{ID}^{(i)}$ where $O_{ID}^{(i)}$ is the ID of the $i^{th}$ operator of n operators. Key merging can be implemented by virtue of the property that a merging or operator IDs maps to a corresponding merging respective keys for the operators in question:

$$O_{new} = \sum_{i=1}^{n} O_{ID}^{(i)} \rightarrow KO_{new} = \sum_{i=1}^{n} KO_{ID}^{(i)}$$

A user device may easily derive the new merged key by using the operators IDs for the plurality of merged operators in this way.

The OTP for the $i^{th}$ user device may contain the key KDi so that it does not have to execute the pairing operation. The operator device may be configured to derive the key KDi for the $i^{th}$ user device by executing the pairing operation. This eliminates the need for the operator device to have a list of all keys KDi of all user devices.

Preferably, in the pairing method between a user device and an operator device, the user device may receive a user device key $KU_{ID}$ formed by applying a first cryptographically secure function to a combination of a personalization key (N) and the user device identifier ($U_{ID}$) e.g., $KU_{ID}=N \cdot U_{ID}$. The operator may receive an operator key ($KO_{ID}$) formed by applying a second cryptographically secure function on a combination of the personalization key (N) and the operator identifier ($KO_{ID}$) e.g., $KO_{ID}=N \cdot O_{ID}$. The user device may comprise a device bilinear mathematical function (e.g., $e(g_1, g_2)$) which defines a pairing over an elliptic curve and the operator device may comprise an operator bilinear mathematical function (e.g., $e(g_1, g_2)$) which defines a pairing over an elliptic curve, these bilinear mathematical function may be such that the result of the application of the operator bilinear mathematical function to the operator key and to the user device identifier is equal to the result of the application of the device bilinear mathematical function to the user device key and to the operator identifier, this result forming a pairing key KD between said multimedia unit and said operator.

The method may comprise, by the user device, receiving a user device key generated by applying a first cryptographically secure function (e.g., $KU_{ID}=N \cdot U_{ID}$) to a personalization key (N) and to the user device identifier ($U_{ID}$), and applying a user device function (e.g., $e(KU_{ID}, O_{ID})$) to the user device key ($KU_{ID}$) and to an identifier of the operator device ($O_{ID}$), resulting in a pairing key (KD) between the user device and the operator device.

The method may comprise, by the operator device, receiving an operator device key generated by applying a second cryptographically secure function ($KO_{ID}=N \cdot O_{ID}$) to a personalization key (N) and to the operator device identifier ($O_{ID}$), and applying an operator device function (e.g., $e(U_{ID}, KO_{ID})$) to the operator device key ($KO_{ID}$) and to an identifier of the user device ($U_{ID}$), resulting in a pairing key (KD) between the user device and the operator device.

In an aspect, the invention may provide a system for accessing conditional access data, wherein the data is transmitted to at least one user device (e.g., a multimedia unit) by at least one operator device to which the user device is to be paired with, the user device comprising a user device identifier, the operator device comprising an operator device identifier, wherein:

the user device comprises a user device key formed by applying a first cryptographically secure function (e.g., $KU_{ID}=N \cdot U_{ID}$) to a personalization key and to the user device identifier;

the operator device comprises an operator device key formed by applying a second cryptographically secure function (e.g., $KO_{ID}=N \cdot O_{ID}$) to the personalization key and to the operator device identifier;

the user device further comprises a user device function and the operator further comprises an operator function, wherein the device function and the operator function are such that the result of applying the operator function to the operator key and to said user device (e.g., multimedia unit) identifier is equal to the result of applying the user device function to the user device key and to the operator identifier, this result forming a pairing key between the user device (e.g., multimedia unit) and the operator.

In another aspect, the invention may provide a method of personalization, by a personalisation apparatus, for pairing at least one operator device and at least one user device, the method comprising:

providing a personalization key, providing an identifier of the user device to be paired, providing an identifier of the operator device to be paired, providing a first cryptographically secure function and a second cryptographically secure function;

calculating a user device key by applying the first cryptographically secure function to the personalization key and to the user device identifier; and, calculating an operator device key by applying the second cryptographically secure function to the personalization key and to the operator device identifier.

The method may comprise transmitting, by the personalisation apparatus, the user device key to the user device. The method may comprise transmitting, by the personalisation apparatus, the operator device key to the operator device.

The method may comprise transmitting the user device identifier (e.g., by the user device) to the operator device with which the user device is to be paired. The method may comprise obtaining the user device identifier by the operator device with which the user device is to be paired. The method may comprise, by the operator device, calculating a pairing key as described herein, using the received user device identifier transmitted to the operator device.

The method may comprise transmitting the operator device identifier (e.g., by the operator device) to the user device with which the operator device is to be paired. The method may comprise obtaining the operator device identifier by the user device with which the operator device is to be paired. The method may comprise, by the user device, calculating a pairing key as described herein, using the received operator device identifier transmitted to the user device.

In a second aspect, the invention may provide a user device configured to be paired with an operator device, the user device being intended to receive conditional access data from the operator device, the user device comprising a user device identifier ($U_{ID}$), the operator comprising an operator device identifier ($O_{ID}$), wherein:

the user device is configured to receive a user device key ($KU_{ID}$) derived from a cryptographically secure function;

the user device comprises a user device bilinear mathematical function (e.g., $e(KU_{ID}, O_{ID})$) defining a pairing over an elliptic curve;

the user device being configured to:

generate a pairing key (e.g., $KD=e(KU_{ID}, O_{ID})$) between the user device and the operator device using the user device key ($KU_{ID}$) and the operator device identifier ($O_{ID}$) as variables of the user device bilinear mathematical function (e.g., $e(KU_{ID}, O_{ID})$).

In a third aspect, the invention may provide an operator device configured to be paired with a user device, the operator device being intended to provide conditional access data to the user device, the operator device comprising an operator device identifier ($O_{ID}$), the user comprising a user device identifier ($U_{ID}$), wherein:

the operator device is configured to receive an operator device key ($KO_{ID}$) derived from a cryptographically secure function;

the operator device comprises an operator device bilinear mathematical function (e.g., $e(U_{ID}, KO_{ID})$) defining a pairing over an elliptic curve;

the operator device being configured to:

generate a pairing key (e.g., $KD=e(U_{ID}, KO_{ID})$) between the operator device and the user device using the operator device key ($KO_{ID}$) and the user device identifier ($U_{ID}$) as variables of the operator device bilinear mathematical function (e.g., $e(U_{ID}, KO_{ID})$).

In a fourth aspect, the invention may provide a personalisation apparatus configured for pairing at least one operator device and at least one user device, the personalisation apparatus comprising:

a memory comprising a personalization key, an identifier of the user device to be paired, an identifier of the operator device to be paired;

a processor configured for calculating a first cryptographically secure function and a second cryptographically secure function, and for;

calculating a user device key by applying the first cryptographically secure function to the personalization key and to the user device identifier; and, calculating an operator device key by applying the second cryptographically secure function to the personalization key and to the operator device identifier.

The personalisation apparatus may comprise a transmitter for transmitting the user device key to the user device. The personalisation apparatus may comprise a transmitter for transmitting the operator device key to the operator device.

The processor may be configured to derive a user device key ($KU_{ID}$) from the first cryptographically secure function comprising the scalar point multiplication operation ($KU_{ID}=N \cdot U_{ID}$) of a personalisation key (N) which defines a point on the elliptic curve and the user device identifier ($U_{ID}$) which defines a point on the elliptic curve.

The processor may be configured to derive an operator device key ($KO_{ID}$) from a second cryptographically secure function comprising the scalar point multiplication operation ($KO_{ID}=N \cdot O_{ID}$) of a personalisation key (N) which defines a point on the elliptic curve and the operator device identifier ($O_{ID}$) which defines a point on the elliptic curve.

The personalisation key (N) preferably comprises an integer number, such as a positive integer or a negative integer. Preferably, the first cryptographically secure function and the second cryptographically secure function each comprise a scalar point multiplication operation over a respective group of points of the elliptic curve. The user device identifier ($U_{ID}$) preferably comprises an element of a first group of points on the elliptic curve. The operator identifier ($O_{ID}$) preferably comprises an element of a second group of points on the elliptic curve. Desirably, the processor is configured to generate the user device identifier ($U_{ID}$) by applying a hash-to-curve algorithm (e.g., $U_{ID}=H(\text{device ID})$) to a device ID of the user device. Desirably, the processor is configured to generate the operator identifier ($O_{ID}$) by applying a hash-to-curve algorithm (e.g., $O_{ID}=H(\text{operator ID})$) to an operator ID of the operator.

The personalisation apparatus may be configured to generate an operator key by merging operator keys, wherein a merged operator key, $KO_{new}$, comprises the sum of respective operator keys $KO_i$ for a plurality of operators:

$$KO_{new} = \sum_{i=1}^{n} KO_{ID}^{(i)}$$

Here $KO_{ID}^{(i)}=N \cdot O_{ID}^{(i)}$ where $O_{ID}^{(i)}$ is the ID of the $i^{th}$ operator of n operators.

The expression "cryptographically secure" may be taken to include a reference circumstances such that if the pairing key is formed by an operation or function applied to a personalization key and to an identifier, the knowledge of the identifier and of the result of the combination does not allow to easily deduce the personalization key, or the result of the combination for another identifier.

It is to be understood that the invention disclosed herein is applicable to provide a pairing between an operator device and a plurality of user devices in which one of the plurality of user devices is configured to generate the same said pairing key (e.g., $KD=e(KU_{ID}, O_{ID})$) between the user device in question and the operator device, using the user device key ($KU_{ID}$) received by the user device in question and the operator device identifier ($O_{ID}$) as variables of the user device mathematical function (e.g., $e(KU_{ID}, O_{ID})$) of the user device in question.

Similarly, it is to be understood that invention disclosed herein is applicable to provide a pairing between a user device and a plurality of operator devices in which one of the plurality of operator devices is configured to generate a pairing key (e.g., $KD=e(U_{ID}, KO_{ID})$) between the user device and the operator device in question, using the operator key ($KO_{ID}$) of the operator in question and the device identifier ($U_{ID}$) as variables of the operator mathematical function (e.g., $e(U_{ID}, KO_{ID})$) of the operator in question.

The invention, in any aspect described herein, may be carried out by a computer. The invention may provide a data processing apparatus/device/system comprising a processor configured to perform steps in the method described in any aspect herein. In an aspect of the invention, there is provided a computer program, and/or a computer program product, comprising instructions which, when the program is executed by a computer, cause the computer to carry out steps in the method described in any aspect herein. In another aspect, the invention provides a computer-readable medium (e.g., a storage medium) comprising instructions which, when executed by a computer, cause the computer to carry out steps in the method described in any aspect herein.

Accordingly, as described above, the invention may use a cryptographic primitive (pairings over elliptic curves) to realize a scheme without undesirable properties of other cryptographic schemes, such as modular exponentiation in an RSA group.

In the context of a Pay-TV or Digital rights management (DRM) system, the proposed mechanism allows provisioning of keys in both secure terminal and head-end while solving the following issues:

Key material is segmented for each operator so to mitigate the impact of leakage. In particular, the head-end of a given operator need not contain keying material that can impact another operator in case of leakage.

Secure terminals may be provisioned with key material in a secure environment before being assigned to a given operator.

Each secure device may have an individual set of keys. The head-end may be able to compute the key of any individual secure terminal but cannot be provisioned with every individual key (no key package). The head-end may hence be able to derive the individual key of a secure terminal based on a limited set of root key material and a terminal public ID.

Conversely, each secure device may be able to interface with different operators by easily deriving a unique segmented key with some root unique secret and operator public ID.

Reverse engineering/key extraction of a single device may only impact keys for that device, i.e. security of other devices is not impacted.

Only the personalisation entity may be able to derive all key material and to provision new keys for both operators and devices by using a global master secret which preferably never leaves control (i.e., remains a secret of) the personalisation entity.

The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which.

DETAILED DESCRIPTION OF THE INVENTION

Aspects and embodiments of the present invention will now be discussed with reference to the accompanying figures. Further aspects and embodiments will be apparent to those skilled in the art. All documents mentioned in this text are incorporated herein by reference.

Figure 1:
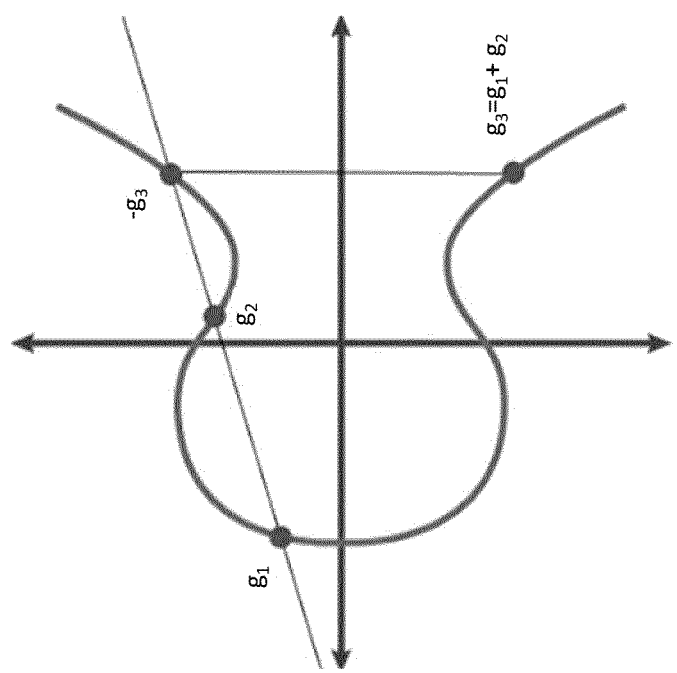
FIG. 1 shows an elliptic curve and a graphical representation of addition of points on the elliptical curve.

Referring to FIG. 1 there is schematically shown an elliptic curve of the form:

$$y^2 = x^3 + Ax + B$$

Figure 2A:
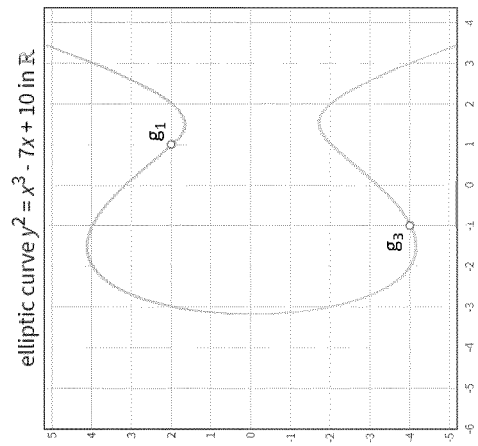
FIGS. 2a, 2b, 2c and 2d show an elliptic curve and a graphical representation of addition of points on the elliptical curve (FIGS. 2a, 2b), and a graphical representation of multiplication on the elliptical curve (FIGS. 2c, 2d)

Here, A and B are constants. A geographical representation of the process for addition of points $g_1$ and $g_2$ lying upon the elliptic curve is illustrated. In particular the result of the addition operation: $g_1+g_2=g_3$, is shown as comprising the step of drawing a straight line through the points $g_1$ and $g_2$, then extrapolating the straight line until it intercepts the elliptic curve again. This point of intercept corresponds to the point $-g_3$. Since the elliptic curve is symmetrical about the x-axis, the position of $g_3$ may be determined by finding the mirror point of $-g_3$ which as reflected about the x-axis. This mirror point also corresponds to the other one of the two points upon the elliptic curve that the vertical line passing through the point-$g_3$ will also pass. Now consider if $g_1=g_2$ such that $g_1+g_2=2\cdot g_1=g_3$. This case is schematically shown in FIG. 2a, in which:

$$y^2 = x^3 - 7x + 10$$

Figure 2C:
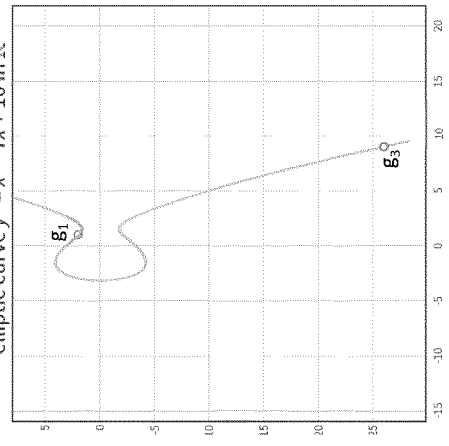
Figure 2B:
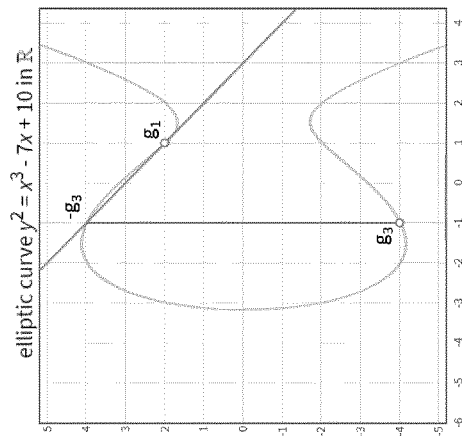
Figure 2D:
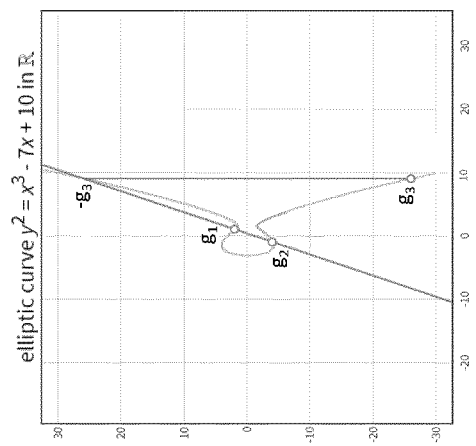

The straight line passing through both $g_1$ and $g_2=g_1$ is the line defining the tangent to the elliptic curve at the point $g_1$. Extrapolation of this tangent line to a point of intercept, $-g_3$, with the elliptic curve then reveals the position $g_3$ on the elliptic curve. In particular, the coordinates of $g_1$ are $g_1=(1, 2)$ and the coordinates of $g_3$ are $g_3=(-1, -4)$. Notably, the summation $g_1+g_2=g_3$ is equivalent to the integer multiplication $2\cdot g_1=g_3$, because $g_1=g_2$. FIG. 2c shows the positions of $g_1$ and $g_3=2\cdot g_1$ upon the elliptic curve of FIG. 2a. Of course, the coordinates of $g_1$ are $g_1=(1,2)$ and the coordinates of $g_3$ are $g_3=(-1, -4)$, as expected. FIG. 2b shows the result of the summation $g_1+g_2=g_1+2\cdot g_1=3\cdot g_1=g_3$. That is to say, the point $g_2\equiv 2g_1$. Here, the point $2\cdot g_1$ is as calculated above and as shown in FIG. 2a and FIG. 2c. By drawing a straight line through the points $g_1$ and $2\cdot g_1$, then extrapolating the straight line until it intercepts the elliptic curve again, the point of intercept $-g_3$ is reached. Its mirror point on the elliptic curve reveals the solution $g_3=(9, -26)$. Notably, the summation $g_1+2g_1=3\cdot g_1$ is equivalent to the integer multi-plication $3\cdot g_1=g_3$. FIG. 2d shows the positions of $g_1$ and $g_3=3\cdot g_1$ upon the elliptic curve of FIG. 2a. The operation denoted above by "·" in the above equations is the scalar-point multiplication over a group of points defining the elliptic curve, such that scalar multiplication by an integer n is equivalent to an n-fold addition:

$$n\cdot g = \underbrace{g+g+\ldots+g}_{n \text{ times}}$$

Figure 3:
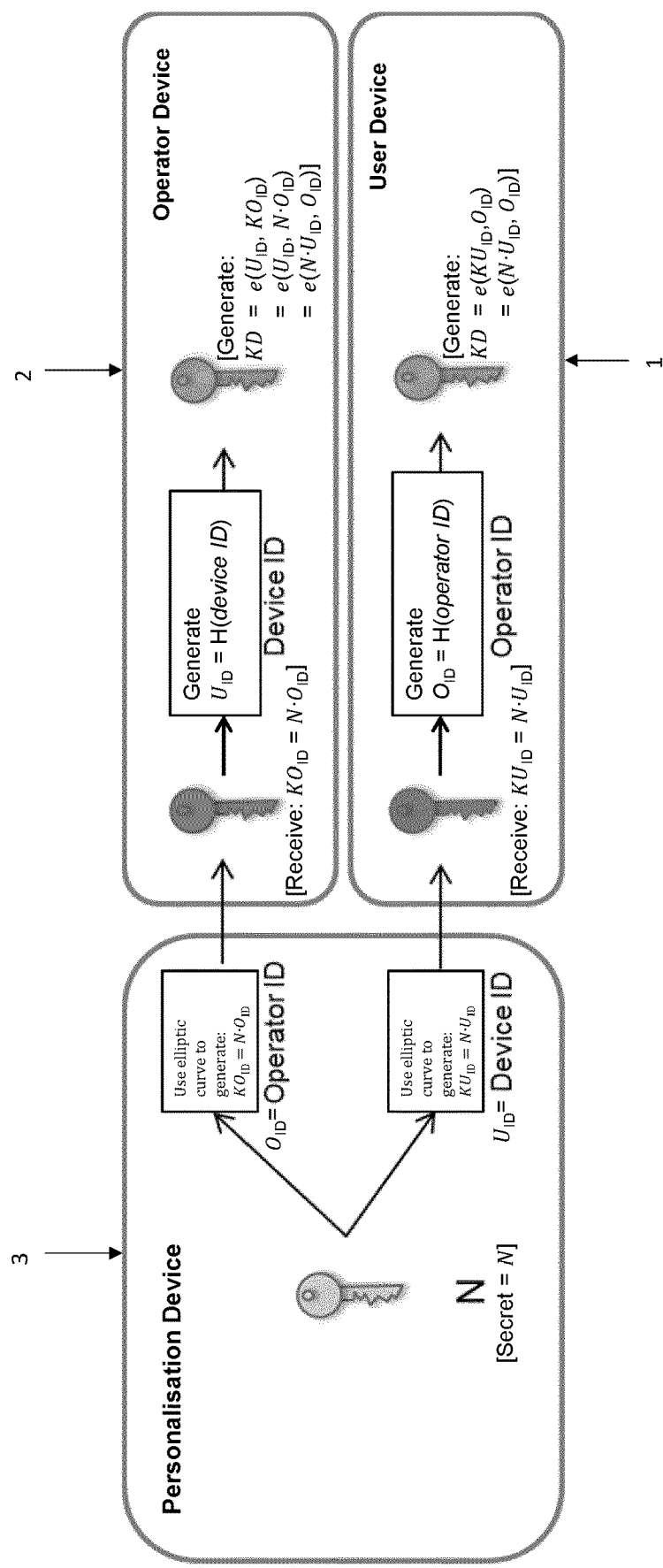
FIG. 3 shows a graphical representation of a system for pairing an operator device and a user device.

FIG. 3 schematically shows an operator device 2 and a user device 1 being intended to receive conditional access data from the operator device. The user device has a user device identifier ($U_{ID}$) and the operator has an operator device identifier ($O_{ID}$). A personalisation device 3 possesses a personalisation key (N) comprising a positive integer number, N. The personalisation device may comprise a computer system or processor configured to generate:

(1) a user device key ($KU_{ID}$) using a first cryptographically secure function comprising the scalar point multiplication operation ($KU_{ID}=N\cdot U_{ID}$) of a personalisation key (N) which defines a point on an elliptic curve and the user device identifier ($U_{ID}$) which also defines a point on the elliptic curve; and, (2) an operator device key ($KO_{ID}$) using a second cryptographically secure function comprising the scalar point multiplication operation ($KO_{ID}=N\cdot O_{ID}$) of the aforesaid personalisation key (N) and the operator device identifier ($O_{ID}$) which defines a point on the elliptic curve.

The first cryptographically secure function and the second cryptographically secure function each comprise a scalar point multiplication operation over a respective group of points of the elliptic curve. A suitable elliptic curve may be, for example, the curve BLS12-381 which can provide efficiency and an adequate level of security (e.g., 128 bits). The user device identifier ($U_{ID}$) comprises an element of a first group of points on the elliptic curve and operator identifier ($O_{ID}$) also comprises an element of a second group of points on the elliptic curve. In other words, each of these identifiers corresponds to a point in an elliptic curve.

The personalisation device 3 is configured to generate the user device identifier ($U_{ID}$) by applying a hash-to-curve algorithm: $U_{ID}$=H(device ID), to the device ID of the user device. The hash function H is a function that maps bit strings of the device ID to points on an elliptic curve. Similarly, personalisation device 3 is configured to generate the operator identifier ($O_{ID}$) by applying a hash-to-curve algorithm: $O_{ID}$=H(operator ID) to the operator ID of the operator or operator device.

Cryptographic protocols often employ a procedure that encodes an arbitrary input, e.g., a password, to a point on an elliptic curve. This procedure is known as hashing to an elliptic curve. The hashing procedure provides collision resistance, in addition it does not reveal the discrete logarithm of the output point. A detailed discussion of hashing to an elliptic curve can be found in the following document by A. Faz-Hernandez et al. as published online on 16 Sep. 2021 by the Internet Engineering Task Force (IETF):

https://datatracker.ietf.org/doc/html/draft-irtf-cfrg-hash-to-curve-12

For example, the $O_{ID}$ and $U_{ID}$ may each be a respective collection of points on the BLS12-381 curve ($O_{ID} \in G_1$, $U_{ID} \in G_2$ or vice-versa). They may be obtained from public IDs by applying the "hash-to-curve" algorithm (H) to the public ID, e.g. $U_{ID}$=H(device ID) and $O_{ID}$=H(operator ID). Alternatively, these $O_{ID}$ and $U_{ID}$ may both simply be public information linked to an operator device and to a user device, respectively.

A personalisation key (N) is a secret value used as a master secret and, in this example, comprises a secret scalar value never exposed outside of the personalisation device, or outside of the control of the entity that controls the personalisation device and uses it to generate keys.

The personalisation device comprises a transmitter (not shown) arranged to transmit the operator key $KO_{ID}$ to the operator device 2, and to transmit the user key $KU_{ID}$ to the user device. The operator device comprises a receiver (not shown) arranged to receive the operator key $KO_{ID}$ transmitted to it by the personalisation device 3, and the user device comprises a receiver (not shown) arranged to receive the user key $KU_{ID}$ transmitted to it by the personalisation device 3.

The user device comprises a user device bilinear mathematical function $e(KU_{ID}, O_{ID})$ and the operator device comprises an operator bilinear mathematical function (e.g., $e(U_{ID}, KO_{ID})$) which each define a pairing over an elliptic curve. As an example, a "Tate pairing" may be implemented.

The operator device 2 is configured to generate the user device identifier ($U_{ID}$) by applying the aforementioned hash-to-curve algorithm: $U_{ID}$=H(device ID), to the device ID of the user device. Similarly, the user device 1 is configured to generate the operator identifier ($O_{ID}$) by applying the aforementioned hash-to-curve algorithm: $O_{ID}$=H(operator ID) to the operator ID of the operator or operator device. This enables the user device to acquire the operator device identifier ($O_{ID}$) and enables the operator device to acquire the user device identifier ($U_{ID}$). With the received key and the acquired device identifier of the other device to be paired with, a given device may proceed to generate the paring key needed to achieve the paring with the other device. The coupled operator-user device units thus have a key which is specific to each couple and is common to the two elements of the couple.

In particular, the operator device 2 is configured to generate a pairing key: $KD=e(U_{ID}, KO_{ID})$ between the user device and the operator device, using the operator key ($KO_{ID}$) and the device identifier ($U_{ID}$) as variables of the operator mathematical function: $e(U_{ID}, KO_{ID})$. Similarly, the user device 1 is configured to generate the same said pairing key: $KD=e(KU_{ID}, O_{ID})$ between the user device and the operator device using the user device key ($KU_{ID}$) and the operator device identifier ($O_{ID}$) as variables of the user device mathematical function $e(KU_{ID}, O_{ID})$. In particular, the operator device generates a pairing key: $KD=e(U_{ID}, KO_{ID})=e(U_{ID}, N \cdot O_{ID})$ between the user device and the operator device, and the user device generates the same pairing key: $KD=e(KU_{ID}, O_{ID})=e(N \cdot U_{ID}, O_{ID})=e(U_{ID}, N \cdot O_{ID})$ between the user device and the operator device.

As a result, the user device and the operator device are able to obtain the same key for their mutual pairing. The device keys $KO_{ID}$ and $KU_{ID}$, permit one pairing in the operator device at the operator premises, and another pairing in the user device. Both giving the same key value, KD.

The key KD for operator is computed by the operator device as:

$$KD = e(U_{ID}, KO_{ID}) = e(U_{ID}, N \cdot O_{ID})$$

The key KD for user device is computed by the user device as:

$$KD = e(KU_{ID}, O_{ID}) = e(N \cdot U_{ID}, O_{ID}) = e(U_{ID}, N \cdot O_{ID})$$

giving the same final value due to the bilinearity property.

The personalisation device is also configured to generate, as and when desired, a new operator key, $KO_{new}$, by merging operator keys used in the pairing system described above. For example, a merged operator key, $KO_{new}$, may be calculated as the sum of respective operator keys $KO_i$ for a plurality of operators:

$$KO_{new} = \sum_{i=1}^{n} KO_{ID}^{(i)}$$

Here $KO_{ID}^{(i)} = N \cdot O_{ID}^{(i)}$ where $O_{ID}^{(i)}$ is the ID of the $i^{th}$ operator of n operators. Key merging can be implemented by virtue of the property that a merging or operator IDs maps to a corresponding merging respective keys for the operators in question:

$$O_{new} = \sum_{i=1}^{n} O_{ID}^{(i)} \rightarrow KO_{new} = \sum_{i=1}^{n} KO_{ID}^{(i)}$$

Figure 4:
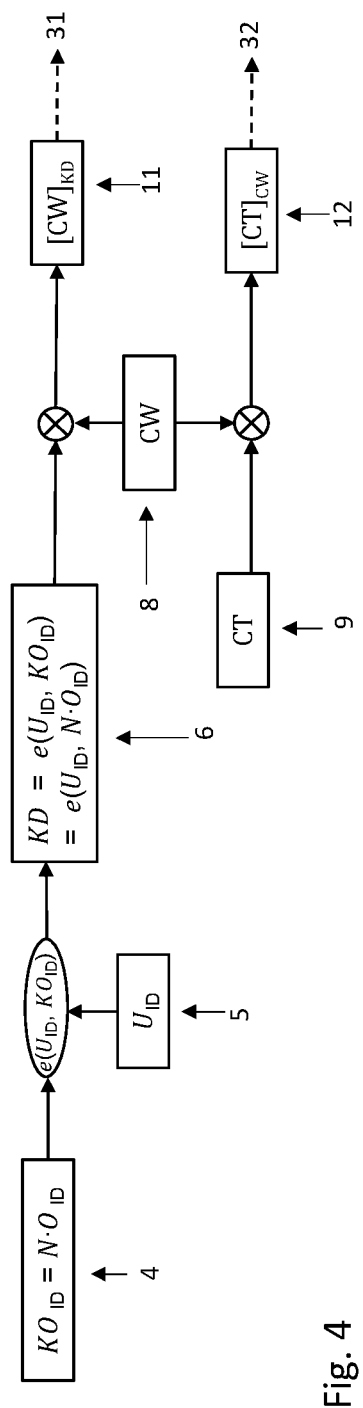
FIG. 4 shows a graphical representation of a system for encryption of conditional access data for transmission from an operator device to a user device.
Figure 5:
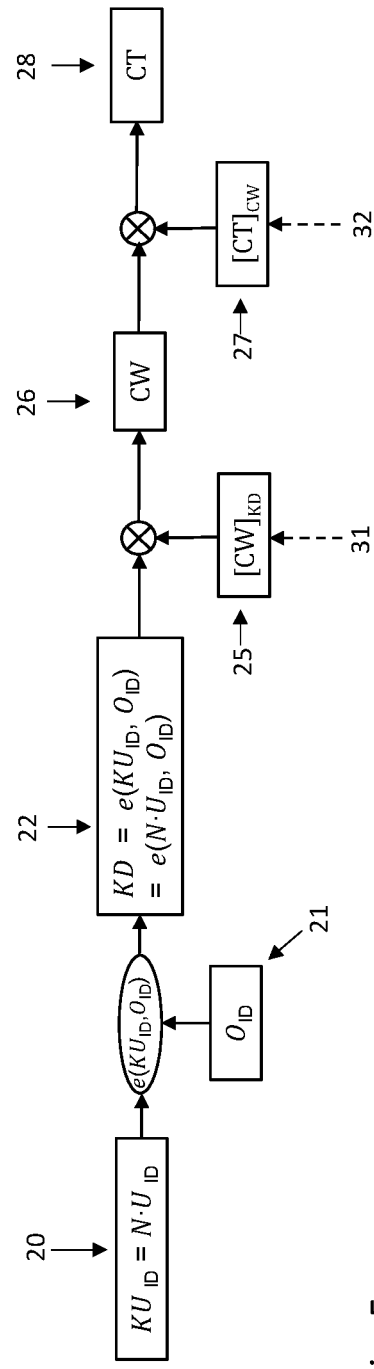
FIG. 5 shows a graphical representation of a system for decryption, by a user device, of conditional access data transmitted according to the system of FIG. 4.

FIGS. 4 and 5 schematically illustrate a graphical representation of a system for encryption (FIG. 4) of conditional access data for transmission from an operator device to a user device, and a graphical representation of a system for decryption (FIG. 5), by a user device, of conditional access data transmitted according to the system of the operator device of FIG. 4.

The pairing key KD calculated (4, 5, 6; 20, 21, 22) between a given operator device and a given user device may be directly used to encrypt content to be transmitted from the operator to the related user device (e.g., multimedia unit). In practice, in the context of a broadcast-type transmission, the content is encrypted by control words CW. In practice, in a broadcast-type transmission mode and as shown in FIG. 4 and FIG. 5, conditional access data 9, CT, is encrypted by means of control words 8, CW, independently of the user device to which this data is intended. This encrypted data 12, $[CT]_{CW}$, is then transmitted 32 in such a way that at least the user device to which this data is intended may receive it. The control words 8 are in turn encrypted 7, $[CW]_{KD}$, by a key KD and transmitted 31 at least to the concerned user device. In particular, the control words 8 are encrypted 7 by means of a key KD specific to the user device and more specifically, to each coupling of operator-user devices, and transmitted 31. This key KD may be the pairing key between the operator and the user device or a key derived from this pairing key.

Decryption is shown in FIG. 5. The user device receives 25 messages, $[CW]_{KD}$, containing at least one control word encrypted by the pairing key KD and decrypts 26 this using the decrypted pairing key KD to provide the control words CW. The user device receives 27 conditional access data, $[CT]_{CW}$, encrypted by control words CW, and decrypts 28 the encrypted conditional access data, $[CT]_{CW}$, to obtain the conditional access data CT.

Thus, to access the conditional access data CT the user device calculates, by a processor or calculation unit (not shown), the pairing key KD by means of the user device function $KU_{ID}$ and the operator identifier $O_{ID}$. This pairing key allows access to the control words CW. These control words CW can then be used for decrypting the conditional access data. In a point-to-point transmission mode for example, the pairing key KD or a key derived from it could be used for directly encrypting contents.

The functions preferably used within the context of the invention meet the following conditions:
(1) If $U_{ID}$ and $KU_{ID}=N \cdot U_{ID}$ are known, it is not possible to calculate N.
(2) If $O_{ID}$ and $KO_{ID}=N \cdot O_{ID}$ are known, it is not possible to calculate N.
(3) Regardless of the number of known couples (KD=e $(KU_{ID}, O_{ID})=e(N \cdot U_{ID}, O_{ID}))$ and KD=$e(U_{ID}, KO_{ID})=e$ $(U_{ID}, N \cdot O_{ID}))$, it is difficult to calculate $KU_{ID}$ (respectively $KO_{ID}$) for a different $U_{ID}$ (respectively $O_{ID}$).

$$KD = e(KU_{ID}, O_{ID}) = e(N \cdot U_{ID}, O_{ID}) = e(U_{ID}, N \cdot O_{ID}) \quad (4)$$

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. A pairing method between a user device and an operator device, the user device being intended to receive conditional access data from the operator device, the user device having a user device identifier (UID), the operator device having an operator device identifier (OID), the method comprising:
   receiving, by the user device, a user device key (KUID) derived from a first cryptographically secure function;
   receiving, by the operator device, an operator device key (KOID) derived from a second cryptographically secure function, wherein the user device comprises a user device bilinear mathematical function (e (KUID, OID)) and the operator device comprises an operator bilinear mathematical function (e (UID, KOID)) which each define a pairing over an elliptic curve wherein the user device bilinear mathematical function and the operator bilinear mathematical function each define a bilinear mathematical function corresponding to the same cryptographic pairing over the same elliptic curve;
   generating, by the operator device, a pairing key (KD=e (UID, KOID)) between the user device and the operator device, using the operator device key (KOID) and the user device identifier (UID) as variables of the operator bilinear mathematical function (e (UID, KOID));
   generating, by the user device, the same pairing key (KD=e (KUID, OID)) using the user device key (KUID) and the operator device identifier (OID) as variables of the user device bilinear mathematical function e (KUID, OID) based on the user device and the operator device being paired; and
   decrypting encrypted data to obtain the conditional access data.

2. The pairing method of claim 1, wherein the first cryptographically secure function and the second cryptographically secure function each comprise a scalar point multiplication operation over a respective group of points of the elliptic curve.

3. The pairing method of claim 2, wherein the user device identifier (UID) comprises an element of a first group of points on the elliptic curve, and the operator device identifier (OID) comprises an element of a second group of points on the elliptic curve.

4. The pairing method of claim 3, wherein the user device identifier (UID) is generated by applying hash-to-curve algorithm UID=H (device ID) to a device ID of the user device.

5. The pairing method of claim 3, wherein the operator device identifier (OID) is generated by applying hash-to-curve algorithm OID=H (operator ID) to an operator ID of the operator device.

6. The pairing method of claim 2, wherein the user device key (KUID) is derived from a first cryptographically secure function comprising the scalar point multiplication operation (KUID=N·UID) of a personalization key (N) which defines a point on the elliptic curve and the user device identifier (UID) which defines a point on the elliptic curve.

7. The pairing method of claim 6, wherein the personalization key (N) comprises an integer number.

8. The pairing method of claim 2, wherein the operator device key (KOID) is derived from a second cryptographically secure function comprising the scalar point multiplication operation (KOID=N·OID) of a personalization key (N) which defines a point on the elliptic curve and the operator device identifier (OID) which defines a point on the elliptic curve.

9. The pairing method of claim 8, wherein the personalization key (N) comprises an integer number.

10. The pairing method of claim 1, wherein a merged operator key, $KO_{new}$, comprises a sum of respective operator keys $KO_i$ for a plurality of operators:

$$KO_{new} = \sum_{i=1}^{n} KO_{ID}^{(i)}$$

where $KO_{ID}^{(i)} = N \cdot O_{ID}^{(i)}$ where $O_{ID}^{(i)}$, is the operator device identifier of an ith operator of n (i) ID operators.

11. The pairing method of claim 1, further comprising:
providing a personalization key, providing an identifier of the user device to be paired, providing an identifier of the operator device to be paired, providing the first cryptographically secure function and the second cryptographically secure function;
calculating a user device key by applying the first cryptographically secure function to the personalization key and to the user device identifier; and
calculating an operator device key by applying the second cryptographically secure function to the personalization key and to the operator device identifier.

12. A system comprising:
an operator device comprising a memory and at least one processor, the operator device having an operator device identifier (OID); and
a user device comprising a memory and at least one processor, the user device having a user device identifier (UID), wherein the user device comprises a user device bilinear mathematical function (e (KUID, OID)) and the operator device comprises an operator bilinear mathematical function (e (UID, KOID)) which each define a pairing over an elliptic curve, wherein the user device bilinear mathematical function and the operator bilinear mathematical function each define a bilinear mathematical function corresponding to the same cryptographic pairing over the same elliptic curve;
the user device configured to:
receive conditional access data from an operator device; and
receive a user device key (KUID) derived from a first cryptographically secure function; and
the operator device configured to:
receive an operator device key (KOID) derived from a second cryptographically secure function; and
generate a pairing key (KD=e (UID, KOID)) between the user device and the operator device, using the operator device key (KOID) and the user device identifier (UID) as variables of the operator bilinear mathematical function (e (UID, KOID));
the user device further configured to generate the same pairing key (KD=e (KUID, OID)) using the user device key (KUID) and the operator device identifier (OID) as variables of the user device bilinear mathematical function e (KUID, OID) based on the user device and the operator device being paired; and
decrypt encrypted data to obtain the conditional access data.

13. The system of claim 12, wherein the first cryptographically secure function and the second cryptographically secure function each comprise a scalar point multiplication operation over a respective group of points of the elliptic curve.

14. The system of claim 13, wherein the user device identifier (UID) comprises an element of a first group of points on the elliptic curve, and the operator device identifier (OID) comprises an element of a second group of points on the elliptic curve.

15. The system of claim 14, wherein the user device identifier (UID) is generated by applying hash-to-curve algorithm UID=H (device ID) to a device ID of the user device.

16. The system of claim 14, wherein the operator device identifier (OID) is generated by applying hash-to-curve algorithm OID=H (operator ID) to an operator ID of the operator device.

17. The system of claim 13, wherein the user device key (KUID) is derived from a first cryptographically secure function comprising the scalar point multiplication operation (KUID=N·UID) of a personalization key (N) which defines a point on the elliptic curve and the user device identifier (UID) which defines a point on the elliptic curve.

18. The system of claim 17, wherein the personalization key (N) comprises an integer number.

19. The system of claim 13, wherein the operator device key (KOID) is derived from a second cryptographically secure function comprising the scalar point multiplication operation (KOID=N·OID) of a personalization key (N) which defines a point on the elliptic curve and the operator device identifier (OID) which defines a point on the elliptic curve.

20. The system of claim 12, wherein a merged operator key, $KO_{new}$, comprises a sum of respective operator keys $KO_i$ for a plurality of operators:

$$KO_{new} = \sum_{i=1}^{n} KO_{ID}^{(i)}$$

where $KO_{ID}^{(i)} = N \cdot O_{ID}^{(i)}$ ID where $O_{ID}^{(i)}$ is the operator device identifier of an ith operator of n operators.

* * * * *